(12) United States Patent
Mohamed

(10) Patent No.: US 9,932,759 B2
(45) Date of Patent: *Apr. 3, 2018

(54) BICYCLE SECURITY DEVICE

(71) Applicant: Mohamed Mohamed, Emeryville, CA (US)

(72) Inventor: Mohamed Mohamed, Emeryville, CA (US)

(73) Assignee: LINKA GROUP LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,320

(22) Filed: Oct. 29, 2016

(65) Prior Publication Data

US 2017/0043828 A1    Feb. 16, 2017

Related U.S. Application Data

(63) Continuation-in-part of application No. 14/715,521, filed on May 18, 2015, now Pat. No. 9,512,649.

(Continued)

(51) Int. Cl.
| | |
|---|---|
| *E05B 71/00* | (2006.01) |
| *B62H 5/14* | (2006.01) |
| *E05B 47/02* | (2006.01) |
| *E05B 39/00* | (2006.01) |
| *E05B 47/00* | (2006.01) |
| *E05B 45/06* | (2006.01) |

(Continued)

(52) U.S. Cl.
CPC .............. *E05B 71/00* (2013.01); *B62H 5/141* (2013.01); *B62H 5/147* (2013.01); *B62H 5/20* (2013.01); *E05B 39/00* (2013.01); *E05B 39/005* (2013.01); *E05B 45/06* (2013.01); *E05B 47/0001* (2013.01); *E05B 47/0012* (2013.01); *E05B 47/023* (2013.01); *B62J 2099/002* (2013.01); *B62J 2099/0013* (2013.01); *E05B 2047/0067* (2013.01)

(58) Field of Classification Search
CPC ...... E05B 39/00; E05B 39/005; E05B 39/007; E05B 39/04; E05B 45/00; E05B 45/005; E05B 45/06; E05B 47/00; E05B 47/0001; E05B 47/0012; E05B 47/02; E05B 47/023; E05B 2047/0067; E05B 2047/0068; E05B 2047/0069; E05B 67/00; E05B 67/06; E05B 67/22; E05B 67/26; E05B 71/00; E05B 73/00; B62H 5/00; B62H 5/14; B62H 5/142; B62H 5/147; B62H 5/20

See application file for complete search history.

(56) References Cited

U.S. PATENT DOCUMENTS

| | | | | |
|---|---|---|---|---|
| 3,965,709 A | * | 6/1976 | Belke | B62H 5/003 70/227 |
| 5,197,310 A | * | 3/1993 | Pedersen | B62H 5/003 70/227 |

(Continued)

*Primary Examiner* — Christopher J Boswell
(74) *Attorney, Agent, or Firm* — Evergreen Valley Law Group; Kanika Radhakrishnan

(57) ABSTRACT

A bicycle locking device coupled to a bicycle and configured to prevent a wheel from turning. The locking device is configured with a transceiver to communicate with a remote device to receive locking and unlocking indications, and to transmit tampering indications to the remote device. The locking device can generate an audible sound when tampering is detected.

12 Claims, 6 Drawing Sheets

Related U.S. Application Data

(60) Provisional application No. 62/055,908, filed on Sep. 26, 2014.

(51) Int. Cl.
  *B62H 5/20* (2006.01)
  *B62J 99/00* (2009.01)

(56) References Cited

U.S. PATENT DOCUMENTS

| | | | | |
|---|---|---|---|---|
| 5,802,889 | A * | 9/1998 | Arnold | B62H 5/14 211/5 |
| 6,043,733 | A * | 3/2000 | Lind | B60R 25/102 307/10.2 |
| 8,854,207 | B2 * | 10/2014 | Williams | E05B 73/0011 340/539.13 |
| 8,949,022 | B1 * | 2/2015 | Fahrner | G01C 21/00 340/995.19 |
| 9,260,885 | B2 * | 2/2016 | Asquith | E05B 45/005 |
| 9,512,649 | B2 * | 12/2016 | Mohamed | B62H 5/147 |
| 2008/0018440 | A1 * | 1/2008 | Aulbers | B62H 5/00 340/432 |
| 2009/0188285 | A1 * | 7/2009 | Cheng | B62H 1/02 70/233 |
| 2012/0299755 | A1 * | 11/2012 | Jones | G08B 13/1436 340/990 |
| 2014/0250954 | A1 * | 9/2014 | Buzhardt | E05B 39/04 70/20 |
| 2014/0352369 | A1 * | 12/2014 | Dasbach | E05B 71/00 70/15 |

\* cited by examiner

BICYCLE SECURITY DEVICE

FIELD OF INVENTION

The present invention relates to security devices for bicycles or other vehicles having spoke wheels, or wheels having openings through which a security bar can pass through. More particularly, the present invention is in the field of bicycle locking devices.

What is needed are locking devices and systems that can connect to the frame of a bicycle, that lock the drive train of the bicycle, that can give a visual indication to people of the locking device, and that can send a remote indication to a person of the opening or tampering with the locking device or bicycle.

BACKGROUND

Current bicycle locks prevent a bicycle from being removed from an anchor. However, once the lock or anchor is broken, the bicycle can be ridden or carried away. Once removed, it is often difficult to recover the bicycle and identify the person taking the bike.

To minimize the likelihood of theft, people have concurrently used multiple types of conventional bicycle locks. However, this has the disadvantage of having to carry multiple locks, the weight of the multiple locks, and having to remember keys and lock combinations for multiple locks. Further, it can be time consuming setting up and unlocking each lock.

SUMMARY OF INVENTION

Various invention embodiments provide an easy and convenient way to lock a bicycle. In one embodiment, the bicycle locking device is comprised of a housing that is coupled to a bicycle frame with a mounting bracket. The housing has a housing gap through which the bike wheel passes. The housing forms a housing arc having a housing gap through which the bicycle wheel passes. The gap in the housing arc is wider than the bicycle wheel width. A locking ring is provided within the housing. The locking ring includes a cross-sectional shape of square or rectangle with chamfered or rounded edges. Further, the housing includes a gasket arranged between the front casting and the rear casting for sealing the housing.

The housing includes an actuator component configured to act upon the locking ring. In one embodiment that actuator component acts upon the locking ring by engaging gear teeth formed into the locking ring.

A communication electronics component can be configured into the housing. The communication electronics component is configured to generate an indication for the electronic actuator component to move the locking ring into a locked or unlocked position depending on the message received.

The bicycle locking device can include an accelerometer electronics component and a sound generation component. The accelerometer component detects the motion of the bicycle when locked and is configured to activate the sound generation component when upon detection of motion or other indications of tampering.

The accelerometer electronics is adapted to learn user operational status to adjust sensitivity of the accelerometer for controlling the sound generating electronics to output sound based on operational status. The sensitivity of the accelerometer is set to be high and low to avoid false siren alarm.

The locking device can include a mounting bracket that couples to the bike and is configure to latch the lock housing to the bracket by an approximate ninety degree turn that cannot be performed when the locking device is locked to a bicycle wheel.

In another embodiment, the locking device includes a GPS (Global Positioning System) receiver that can determine location, position, velocity and combination thereof. The GPS receiver is located in the housing and operable to determine location, position, velocity or a combination thereof. The GPS receiver is operable to communicate with a cloud server using the communication electronics component to transmit the determined location, position, velocity or a combination thereof.

In a further embodiment, the locking device can include a lamp that can be positioned to illuminate either forward or backward. Further, the lamp can be controlled by an accelerometer unit that enables the lamp when decelerating.

In another aspect of the inventive device, a remote controller is disclosed. The controller has a body containing a transceiver that is configured to communicate wirelessly with the bicycle lock device. The remote controller includes a first function that can send a wireless message to the bicycle lock device indicating that the device should be locked. In a further embodiment, the device can include a second button that when asserted sends a wireless message to the bicycle lock to unlock the device.

DETAILED DESCRIPTION OF THE INVENTION

The following description of the invention is provided as an enabling teaching of the invention. Those skilled in the relevant art will recognize that many changes can be made to the embodiment described, while still attaining the beneficial results of the present invention. It will also be apparent that some of the desired benefits of the present invention can be attained by selecting some of the features of the present invention without utilizing other features. Accordingly, those skilled in the art will recognize that many modifications and adaptations to the present invention are possible and can even be desirable in certain circumstances, and are a part of the present invention. Thus, the following description is provided as illustrative of the principles of the present invention and not a limitation thereof.

Figure 1:
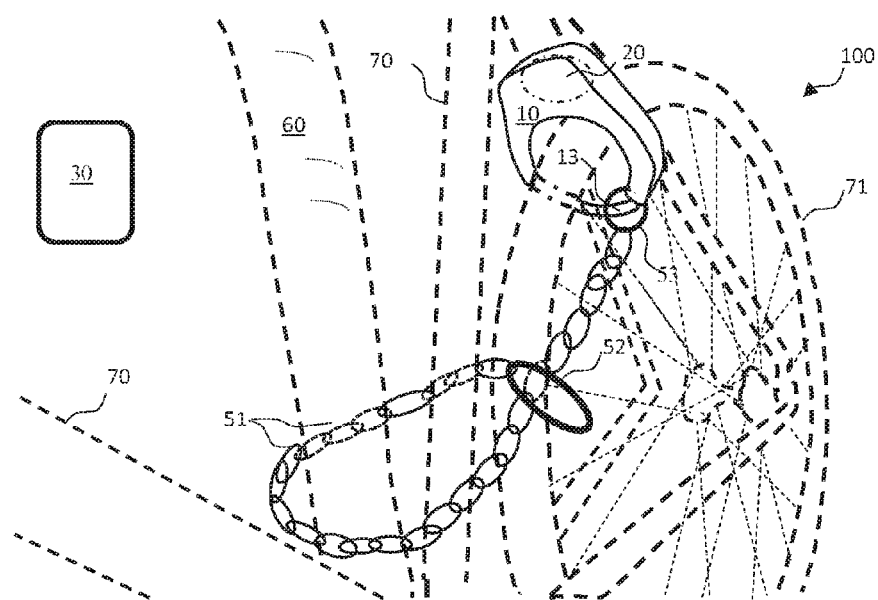
FIG. 1 is an environmental, perspective view of a locking system with a locking device coupled to a bicycle and a chain engaged with a locking ring.

The bicycle locking system prevents a bicycle wheel from turning and couples a bike (or bicycle) to a secure anchor. Referring to FIG. 1, the locking system 100 is shown in its operational environment. The locking system 100 can include the locking device 10 coupled to a mounting bracket 20 that is coupled to a bicycle 70, a locking chain 51, end rings 52, 53, and a wireless controller 30 which includes but is not limited to a smart phone or other mobile device. The locking device 10 is coupled to the rear bicycle brake anchor through the mounting bracket 20 designed to couple with a lock flange 15 which is part of the locking device's rear casting 12b. While the locking device 10 is shown coupled to frame 73 (also referred to 'bike frame 73' or 'bicycle frame 73') of the bicycle 70 adjacent to the rear wheel 71, the locking device 10 attachment to the front of the bicycle 70 or at other points on the frame 73 of the bicycle 70 is contemplated.

The wireless controller 30 is shown for use by a person to lock and unlock the locking device 10, and receive indications of bicycle 70 tampering. The wireless controller 30 can be a phone or other mobile device with wireless capabilities based on protocols for personal area networks or wide area networks, including but not limited to communication protocols based on IEEE 802.15, herein after "Bluetooth". Mobile devices include but are not limited to smart phones, personal digital assistants, iPods, and iPads. The locking chain 51 and the end rings 52, 53 are used to secure the bicycle 70 to an external anchor 60 such as a bike rack.

The locking system 100 can include a locking chain 51. The locking chain 51 includes two rings, 52, 53 coupled to each end of the chain 51, One ring 52 is larger than the second ring 53 and has a sufficient inside diameter to pass the chain 51 and smaller ring 53 through the inner opening of the larger ring 52. Further, the smaller ring 53 has an inner diameter sufficient for a locking ring 13 to pass through. This configuration permits the locking chain 51 to be put around the anchor 60, around either the bicycle wheel 71 or the frame 73 of the bicycle 70, through the larger ring 52, and have the locking ring 13 pass though the smaller ring 53 and thereby securing the bicycle 70 to the anchor 60. While the rings 52, 53 are shown to be circular, other shapes are contemplated. Alternatively, the chain 51 can be a cable (not shown) with a small loop on one end and a larger loop on the other end. The large loop should have an inner diameter large enough for the smaller loop to pass through. The smaller loop and larger loop are sized for the smaller loop to pass through the larger loop.

Figure 2:
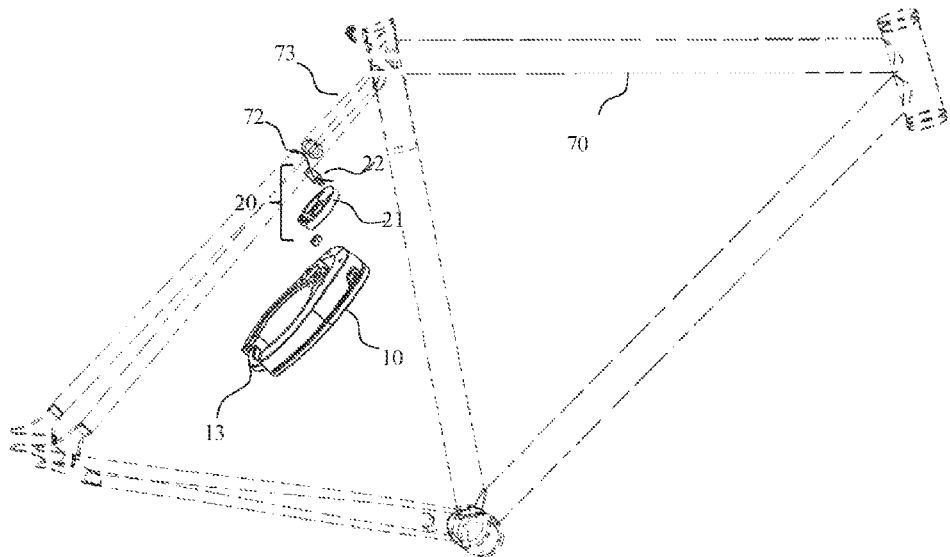
FIG. 2 is a side view of the locking device and mounting bracket.
Figure 8:
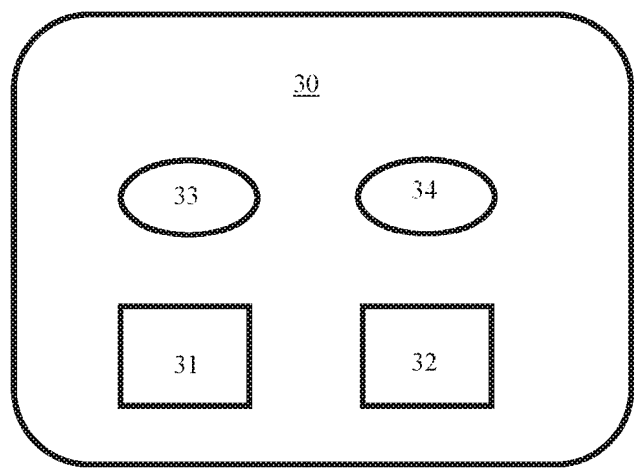
FIG. 8 is a schematic view of a wireless controller.

Referring to FIG. 2, a side view is shown of the locking device 10 and the mounting bracket 20 in relation to the bike frame anchor hole 72. A front casting 12a and the rear casting 12b includes the locking ring 13, and can include an electronic locking ring actuator, a communications module, and a sound-emitting module, and a power supply module. These modules are shown in FIGS. 3 and 8 and described in further detail below.

Figure 3:
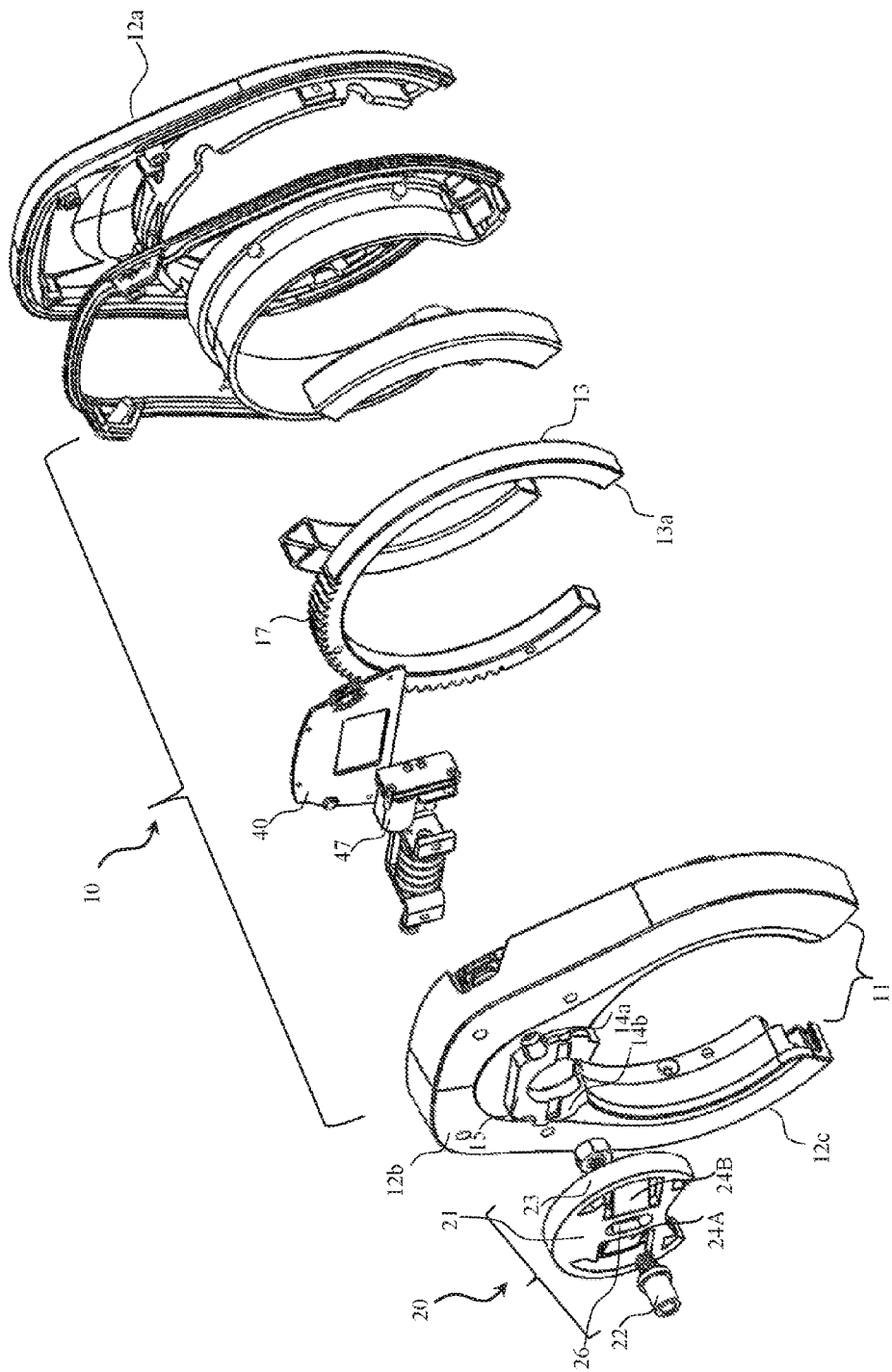
FIG. 3 is an exploded view of the locking device.

Referring to FIG. 3, an exploded view of the locking device 10 and the mounting bracket 20 is shown and described. The mounting bracket 20 is comprised of a mount anchor bolt 22 and a nut 23 which fits through a centered slot 26 in a bracket 21 and to the bike frame 73. The bracket 21 has two coupling tabs 24a and 24b formed into the bracket 21 and spaced away from a lip 16 configured to engage lock flange tabs 14a, 14b. The anchor bolt 22 and the nut 23 are configured to be compatible with coupling to rear bike brake anchor.

The major components of the locking device 10 are a front casting 12a, a rear casting 12b, a locking ring 13 and a lock actuator 47 coupled to an electronics module 40 which further includes control and communication electronics components. The lock actuator 47 includes an electronic actuator component and a worm gear coupled with an actuator motor. The lock actuator 47 and the electronics module 40 are contained between the front casting 12a and the rear casting 12b which protects them from the elements and tampering.

The housing, i.e. formed by the front casting 12a and the rear casting 12b, includes a gasket (not shown) arranged between the front casting 12a and the rear casting 12b for sealing the housing. The gasket may be arranged in a slot of the front casting 12a or in a slot of the rear casting 12b; otherwise the gasket may be arranged in a slot configured by both front and rear castings 12a, 12b. Alternatively, the gasket may be configured to be simply arranged between the front and rear castings 12a, 12b and may be retained therebetween when the front and rear castings 12a, 12b are coupled to each other. In an example, the gasket may be an O-ring or a flat sheet. Further, the gasket may be made of a material selected from a group consisting of paper, rubber, silicone, metal, rubber, plastic polymer or any combination thereof. The gasket seals the housing by expanding when arranged between the front and rear castings 12a, 12b (are coupled to each other). The gasket provides water and dust resistant barrier to prevent any harm to any or all components (such as the locking ring 13, the control and communication electronics components of the electronics module 40, the lock actuator 47 and so forth) received in the housing between the front and rear castings 12a, 12b.

The lock actuator 47 acts upon the locking ring 13 to move it from a first unlock position to a second locked position and back to the first unlocked position. The control and communication electronics components of the electronics module 40 are described further below.

The locking ring 13 can include teeth 17 formed into the locking ring 13. The teeth 17 are configured to engage with an actuator component of the lock actuator 47. A worm gear is shown coupled with the actuator motor of the lock actuator 47 to act on the locking ring 13. While teeth 17 are shown, other means for acting on the locking ring 13 are contemplated. These include but are not limited to using friction, electromagnetic forces, mechanical linkages, a linear actuator, rack and pinion, a spur gear, lead screw, a retracting spring or a combination thereof to act on the locking ring.

The locking ring 13 is shown in the unlocked position. The locking ring 13 rotates within the housing formed by the front casting 12a and the rear casting 12b between the first position (unlocked) and the second position (locked). The locking ring 13 preferably forms a circular arc and is positioned between the front and rear casting 12a, 12b which has a channel, guide or groove within the housing casting 12a, 12b. In the first position (unlocked or retracted position), a housing gap 11 is substantially open and free from the locking ring 13. The locking ring 13 can extend small distance into the gap 11 so long as the locking ring 13 does not interfere with the rotation of the bike wheel 71. In the locked position, the locking ring 13 transects the housing gap 11 and meets the housing channel on the opposing side.

In one embodiment, one arm 12c of the front and rear casting 12a, 12b has extra material to strengthen that arm 12c. This is the arm 12c from which the locking ring 13 rotates out of when locked. Because when in the locked position, one side is strengthened by the locking ring 13 but the other arm 12c is weaker because the locking ring 13 has rotated out of the arm 12c. Therefore, to prevent this weak point, the extra material can be provided in the one arm 12c.

Preferably the locking ring 13 is formed of a strong material that is not easy to cut, bend or break and is not flexible. These materials include but are not limited to steel, stainless steel, metal alloys, aluminum, plastics, or a combination thereof. Further, the locking ring 13 includes a cross-sectional shape of square and rectangle. Moreover, edges of the locking ring 13 can be chamfered or rounded. Therefore, the locking ring 13 may include a cross-sectional shape, such as circular, oval or polygonal. In the open position, a locking ring end 13a can be substantially flush with the housing gap. In the locked position, the locking ring 13 transects the housing gap 11. The typical width of a bicycle tire is 18-40 millimeters. The housing gap 11 can be greater than 40 millimeters to accommodate most bicycle wheels. When the locking device 10 is mounted on the bicycle 70 the locking ring 13 will pass under the rim of the bicycle 70 and prevent the wheel 71 from turning.

The rear casting 12b can include the lock flange 15 with two flange tabs 14a, 14b. These flange tabs 14a, 14b and the lock flange 15 are configured to engage and latch to the mounting bracket 20 when engaged and twisted together to lock the bracket 21 with the lock flange 15.

Figure 4:
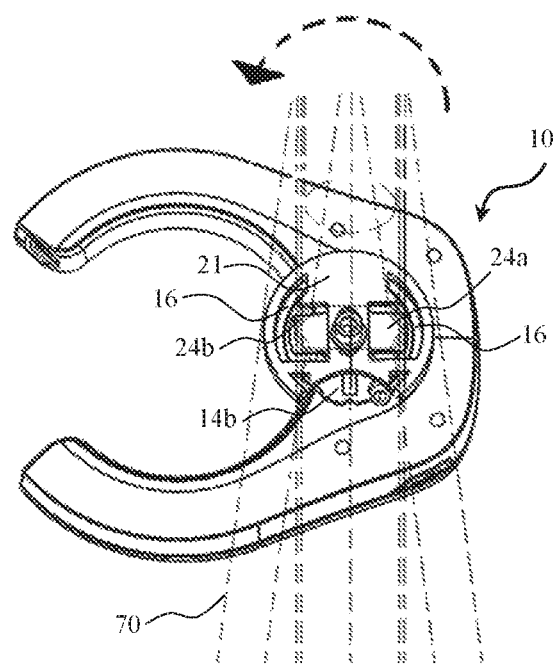
FIG. 4 is a rear view of the locking device being coupled to the mounting bracket.
Figure 5:
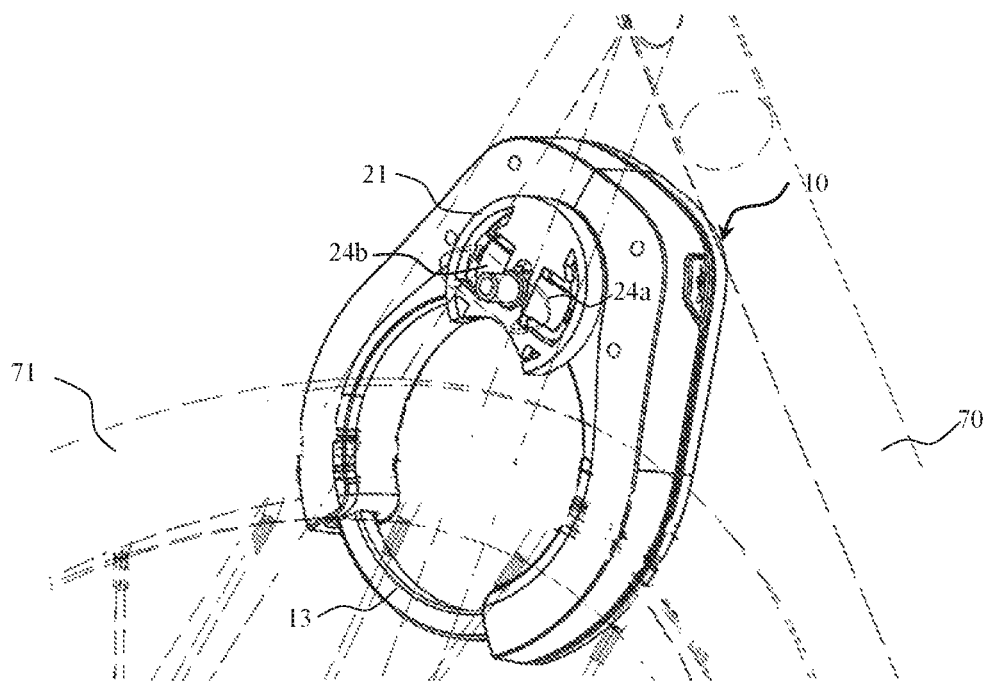
FIG. 5 is an isometric rear view of the locking device coupled to the mounting bracket and locked.

Referring to FIG. 4, the locking device 10 is shown positioned to couple to the mounting bracket 20. The locking device 10 is positioned approximately ninety degrees rotated from the operating position as shown in FIG. 5. FIG. 5 is an isometric rear view of the locking device in a locked state coupled to the mounting bracket. The locking device 10, as shown, is slid upward so that the lock flange 15 and flange tabs 14a, 14b slide into a recess in the bracket 21 and rests on the lip 16 inside the bracket 21. The locking device 10 is then rotated counterclockwise (as shown) which causes the flange tabs 14a, 14b slide between and be held by the lip 16 and coupling tabs 24a, 24b (also referred to as 'bracket tabs' and 'mount tabs'). Preferably, the fit between the coupling tabs 24a, 24b, the lip 16, and the flange tabs 14a, 14b is sufficiently tight to hold the locking device 10 in a secure position. The bracket tabs 24a, 24b can even be formed to flex thus providing a tight frictional fit. The bracket 21 and the lock flange 15 can have male and female protrusions that engage each other when twisted into in the operating position, which will further hold the locking device 10 in place.

Referring to FIG. 5, the locking device 10 is shown in the operating position, coupled to the bracket 21, with the locking ring 13 engaged. The flange tabs 14a, 14b are behind the bracket tabs 24a, 24b and can be held in place by friction between the bracket tabs 24a, 24b and the lip 16 spaced away from the tabs 24a, 24b running along the inside of the bracket 21.

Figure 6:
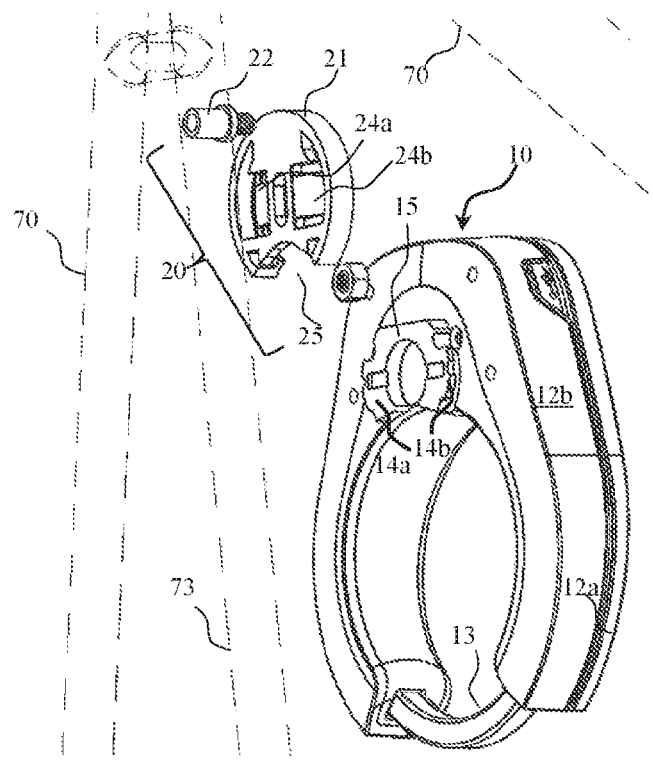
FIG. 6 is an exploded view of the locking device and mounting bracket.

Referring to FIG. 6, an exploded view of the locking device 10 and the mounting bracket 20 is shown in relation to the bicycle 70.

Figure 7:
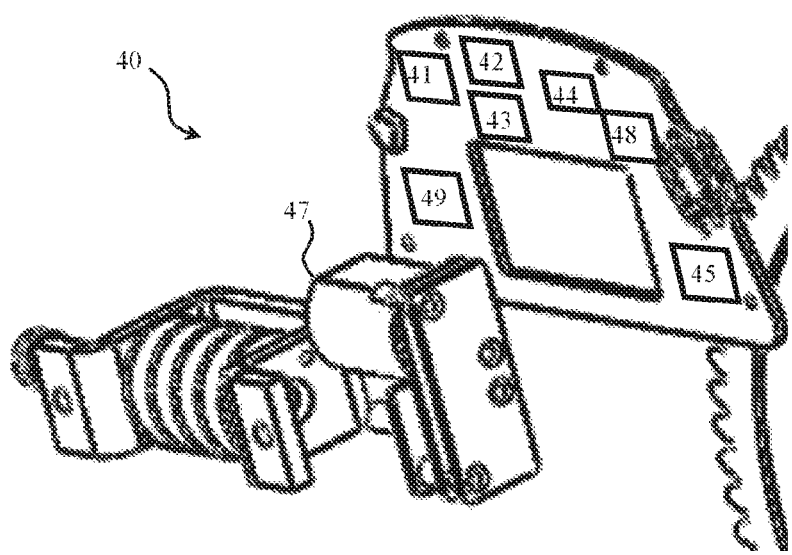
FIG. 7 is a view of an electronics module and a locking ring actuator.

The rear casting 12b can include control and communication electronic components of the electronics module 40 as shown in FIG. 7. These components can include a communication electronics component 41, and a power supply 42, an accelerometer electronics 43, a temperature sensor component 44, a GPS receiver 45, a sound-generating electronics 48 (operable to generate sound if the bicycle locking device 10 is tampered with or the bike moved or combination thereof), and a lock transceiver component 49.

The electronics components 41, 42, 43, 44, 45, 48 and 49 are shown located at the top of the housing but can be located in different locations within the locking device 10. One skilled in the art of designing wireless communication devices and controllers would know how to design a controller and wireless communication device utilizing the desired protocols and transceivers.

Referring to FIG. 8, a view of the wireless controller 30 is shown. The wireless controller 30 is configured to wirelessly communicate with and control the locking device 10. Preferably, a low power wireless protocol is used including but not limited to Bluetooth. The wireless controller 30 can be part of a mobile device with an application installed utilizing the memory, processor, and transceiver resources of the mobile device. The mobile device can include but is not limited to smart phones, mobile computers, and personal digital assistants. The control functions include but are not limited to locking and unlocking. Communication functions can include but are not limited to indications of tampering of the locking device 10.

Communication is provided with wireless transceiver electronics 31 and a power source 32. The wireless transceiver electronics 31 can be based on the communication standards including but not limited to Bluetooth IEEE 802.15, WiFi 802.11, Zigbee, cellular protocols, texting protocols or a combination thereof. Further the communication can utilize the Industrial Scientific Medical Band and custom protocols. One skilled in the art of building and designing low power wireless communication devices would be capable of providing these functions. The wireless transceiver electronics 31 can include control functions for processing received communications and transmitting control indications. These functions, including control and transceiver functions can be shared with the mobile devices electronics.

The wireless controller 30 can include one or more buttons for controlling the locking device 10. These buttons can be part of an application on a mobile device. The wireless controller 30 can have a first function button 33. The first function button 33 can be configured to interface with the wireless transceiver electronics 31 to generate the unlock message for the locking device 10. This message is received by the lock transceiver component 49. Further, the wireless controller 30 can have a second function button 34. The second function button 34 can be configured to interface with the wireless transceiver electronics 31 to generate the lock message for the locking device 10. This message is received by the lock transceiver component 49 which results in the locking ring 13 being moved to the lock position.

Other button configurations are contemplated. Control of the locking device 10 can be implemented with a single button and by button pressing sequences. Further, input methods not using buttons are contemplated including but not limited to switches and motion detection devices.

In a further embodiment, the wireless controller 30 can be configured to receive an indication that tampering is occurring to the bicycle 70 or locking device 10. A message is sent from the electronics module 40 wirelessly to the wireless controller 30 which in turn will generate an indication on the wireless controller 30 or another device that can include but not limited to a mobile phone.

In another embodiment, the wireless controller 30 is transmitting or receiving a wireless signal. This transmission can be either continuously or periodically. The strength of the signal from the wireless controller 30 paired with the locking device 10 is monitored by either the wireless controller 30 or the electronics module 40. In one embodiment, the controller uses the signal strength from the electronics module 40 to determine that the wireless controller 30 is near the locking device 10. In one embodiment, the wireless controller 30 determines that it is near the locking device 10, it can be configured to automatically send a wireless unlock message.

In one embodiment, the accelerometer electronics 43 is adapted to learn operational status to adjust sensitivity of the accelerometer for controlling the sound generating electronics 48 to output sound based on the operational status. Specifically, based on the various operational status of the bicycle 70 the sensitivity of the accelerometer may be adjusted to trigger a siren alarm. This limits number of notifications that may be provided to the user as well as sirens being activated due to false alarms, According, to an embodiment accelerometer electronics 43 may be associated with a memory having at least one algorithm to be executable to acquire data related to the various operational status of the bicycle 70, and further based on such data make the accelerometer electronics 43 to learn various operational status and accordingly further adjust sensitivity thereof. The sensitivity of the accelerometer electronics 43 is set to be high and low to avoid false siren alarm.

For example, when the bicycle 70 is at the user's home (which may be identified using GPS coordinates), a sensitivity of the accelerometer electronics 43 is set high as to notify the user even gentlest (or slightest) movements. It may be evident that the bicycle at the user's home or premises may not be generally subjected to movements apart from the movement produced by the user, therefore in such condition setting the sensitivity of the accelerometer high may enable in detecting any gentlest movements, which may be associated with the tampering of the locking device 10. Therefore, the user may be notified, even with the gentlest movements, by a siren alarm.

Alternatively, when the bicycle 70 is driven in a high traffic city environment (which may be also identified using GPS coordinates), a sensitivity of the accelerometer electronics 43 is set low as to avoid notifications and false alarms, which may be caused by driving conditions subject to the bicycle 70. It may be evident that the bicycle 70 driven in a high traffic city environment may be subjected to substantial movements, which may cause the accelerometer electronics 43 to trigger a false alarm. However, the accelerometer electronics 43 of the locking device 10 operates intelligently to limit notifications and false alarms, i.e. may not trigger siren alarm even with substantial movement and may trigger siren alarm even with slightest movement, based on the operational status.

In one embodiment, the GPS receiver 45 is operable to communicate with a cloud server, in addition to the user's device, not shown. The GPS receiver 45 uses the communication electronics component 41 (and/or lock transceiver component 49) to transmit the determined location, position, velocity or a combination thereof. The cloud server may be built, hosted and delivered through a cloud computing platform over the Internet to receive the data associated with the GPS receiver. Further, the cloud server may be accessed remotely from a cloud service provider. The communication electronics component 41 in such instance is configured to operate in a Global System for Mobile communication (GSM) environment. For example, the communication electronics component 41 (and/or lock transceiver component 49) may include a GSM based Subscriber Identity Module (SIM) card for enabling such communication. Therefore, the determined data of the GPS receiver 45, i.e. location, position, velocity or combination thereof is transferred to the cloud server by way of the GSM based SIM card. Alternatively, the communication electronics component may be configured to operate in a Code division multiple access (CDMA) environment for enabling communication between the GPS receiver and the cloud server.

In one embodiment, the GPS receiver 45 data is communicated or transmitted to the cloud server, which may be associated with an enforcement agency server, such as special, local, or state police station. Therefore, based on the GPS receiver 45 data and user's confirmation a stolen bicycle (having the locking device 10 of the present disclosure) may be tracked or searched, and also tampering of the locking device may be monitored.

Figure 9:
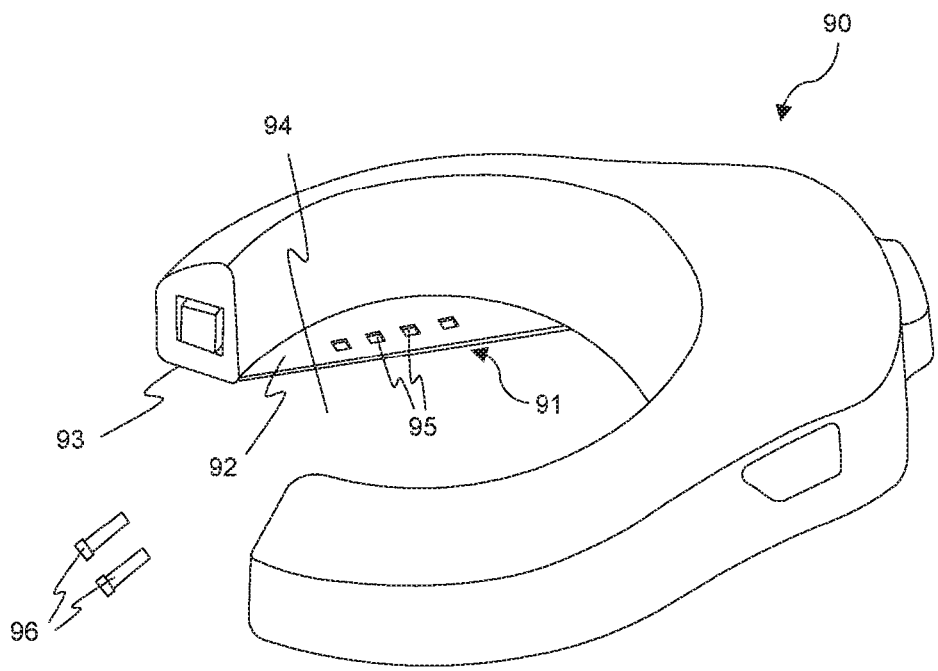
FIG. 9 is an isometric top view of a locking device, in accordance with another embodiment of the present discourse.

Referring now to FIG. 9, illustrated is an isometric top view of a locking device 90, in accordance with another embodiment of the present discourse. The locking device 90 is substantially functionally and structurally similar to the locking device 10, explained hereinabove in conjunction with FIGS. 1-8. However, the locking device 90 of the present embodiment includes an alternative mounting mechanism 91. As shown, the mounting mechanism 91 includes at least one locking flange, such as a locking flange 92. It is to be understood that, the locking device 90 also includes another locking flange (not shown). The locking flanges, such as the locking flange 92, are arranged symmetrically on (or extending from) a housing, particularly, on a rear casting 93 (or rear portion) of the locking device 90. It is evident that the locking flanges, such as the locking flange 92, are arranged in a manner such that a housing gap 94 includes a size through which a bicycle wheel can pass. The locking flanges, such as the locking flange 92, include a plurality of mounting holes, such as mounting holes 95 arranged on the locking flange 92. The mounting mechanism 91 also includes at least one locking bolt, such as locking bolts 96 (for example M5 bolts), adapted to be received through the mounting holes 95 for mounting the locking device 90 on the bicycle 70, which is explained in detail in conjunction with FIG. 10.

Figure 10:
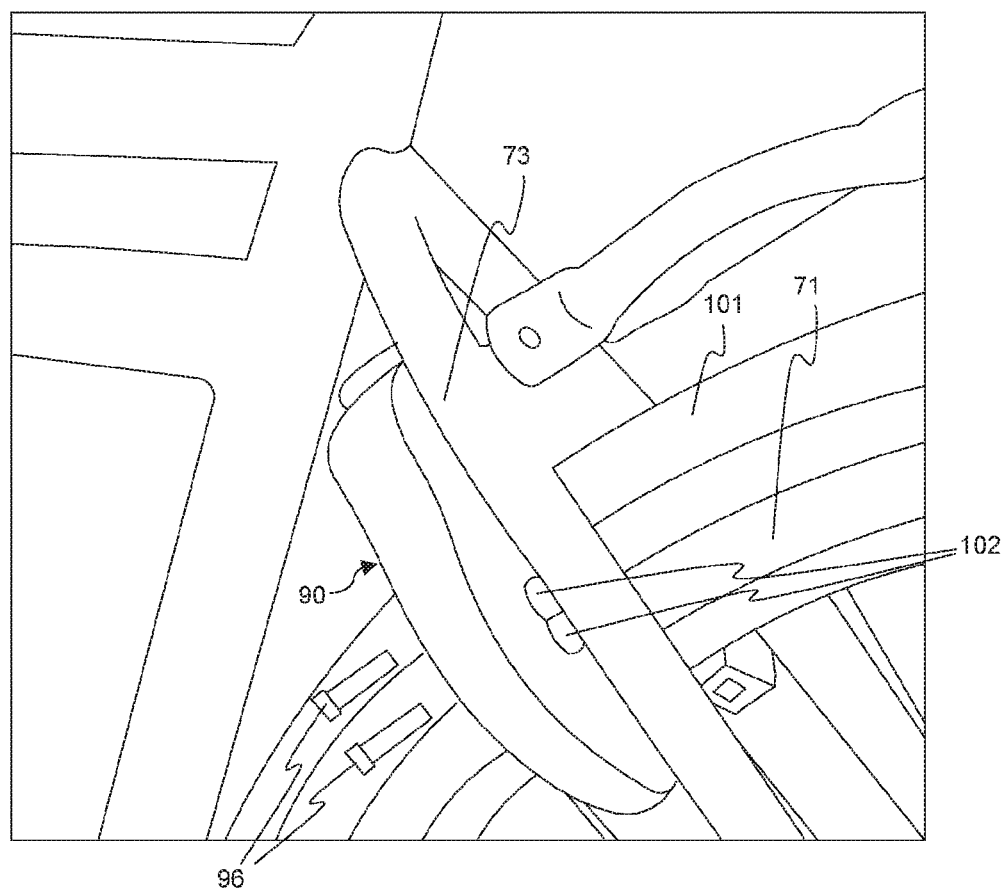
FIG. 10 is an environmental perspective view of the locking device of FIG. 9 to be mounted on a bicycle.

FIG. 10 is an environmental perspective view of the locking device 90 to be mounted on the bicycle 70. Specifically, the locking device 90 is shown adapted to be mounted on the bicycle frame 73 (e.g., a seat state frame of the frame 73, and also referred to as 'seat state frame 73') of the bicycle 70. As shown, the locking device 90 is arranged over a fender 101 and the wheel 71 passes through the housing gap 94 (shown in FIG. 9) of the locking device 90. The seat state frame 73 is configured to have at least one bolt recess, such as bolt recesses 102, arranged thereon. The at least one bolt recess, such as the bolt recesses 102, are configured to receive the locking bolts 96, passing through the mounting holes, such as mounting holes 95, of the locking flanges, such as the locking flange 92 (shown in FIG. 9). It is to be understood that, the bolt recesses 102 are aligned with the mounting holes 95 prior to inserting the locking bolts 96 therethrough. Accordingly, the mounting mechanism 91 (shown in FIG. 9) enables in conveniently and effectively mounting the locking device 90 on the seat state frame 73 of the bicycle 70.

Operational Example

In operation, the locking device 10 has to be first installed on the bicycle 70. First the bracket 21 needs to be coupled to frame 73 of the bicycle 70. Preferably, the bracket 21 is coupled to frame 73 of the bicycle 70 using the bike frame anchor hole 72. A specially designed anchor bolt 22 is required to accommodate the bike brake and the locking device 10. Once the bracket 21 is mounted to the bicycle 70, the rear wheel 71 is removed.

The next step is to couple the locking device 10 to the bracket 21. The back of the rear casting 12b is configured with the lock flange 15 with two horizontally orientated flange tabs 14a, 14b. The flange tabs 14a, 14b extends from the center of the lock flange 15 along a radial line through the center of the lock flange 15. The locking device 10 is held substantially perpendicular to plane of the wheel 71 and slid over the mounting bracket 20. The mounting bracket 20 has two mount tabs 24a, 24b located approximately one hundred and eighty degrees from each other and mounted in a substantial horizontal orientation. The bracket 21 also has a recess configured to receive the lock flange 15 and the flange tabs 14a, 14b when substantially vertically orientated. In this orientation, the locking device 10 is positioned ninety degrees from its installed orientation. The bracket 21 has the lip 16 which provides a surface against which the flange tabs 14a, 14b rest. As the locking device 10 is rotated and towards its installed position, the flange tabs 14a, 14b will slide between the mount tabs 24a, 24b and the lip 16. The mount tabs 24a, 24b are configured to provide a gap between the lip 16 and the mount tabs 24a, 24b that is equal to the thickness of the flange tabs 14a, 14b. Further, the mount tabs 24a, 24b can be configured to flex and thereby allowing the gap to be less than the thickness of the flange tabs 14a, 14b. Once the locking device 10 rotated to the installed position, the locking device 10 is securely coupled to the bicycle 70 by the friction fit of the flange tabs 14a, 14b between the lip 16 and the mount tabs 24a, 24b.

Next the rear bicycle wheel 71 is installed. The bike rider then rides to a location having the anchor 60 for the bicycle 70. The rider then takes his locking chain 51, wraps the chain 51 around the anchor 60 and part of the bicycle frame 73, slides the smaller ring 53 through the larger ring 52 and positions the smaller ring 53 so that when the locking ring 13 moves to the locked position, that the locking ring 13 will pass through the inside of the smaller ring 53.

Alternatively, the locking device 90 of the present disclosure is installed on the bicycle 70 using the mounting mechanism 91.

The user then asserts a lock indicator 33, the first function button on the wireless controller 30 which sends a wireless signal, preferably using Bluetooth, which is received by the electronics module 40 (also referred to as 'lock electronics 40'). The electronics module 40 decodes a lock message and actives the lock actuator 47 which acts upon the locking ring 13. Alternatively, the user can press a button or switch on the locking device 10 which generate a lock indication to the lock electronics 40. The actuator 47 then acts on the lock ring 13 which rotate into a locked position. The lock electronics 40 can control a light emitting device to provide an external indication that the bike has an anti-tampering device on it. Further, the GPS receiver 45 is operable to communicate with the cloud server using the communication electronics component 41 to transmit the determined location, position, velocity or a combination thereof of the bicycle 70.

While the rider is away from the bicycle 70, the lock electronics 40 monitors indications of tampering with the bicycle 70. Indication can be movement of the bicycle 70, changes in location as determined by GPS electronics, vibration, or a combination of these indications, the locking device 10 sends a wireless message to the wireless controller 30 of these indications. Further, when the locking device 10 is in a locked configuration and receives a tampering indication, the lock electronics 40 can enable an audible alarm.

The rider can then return to the bike and can check the bicycle's status. Moreover, the accelerometer electronics 43 is adapted to learn operational status to adjust sensitivity of the accelerometer for controlling the sound generating electronics 48 to output sound based on the operational status.

When the rider is ready to leave, the rider returns to his bike 70. The lock electronics 40 can detect that the wireless controller 30 is near the bike 70 by monitoring the wireless signal strength of the device to which it was paired under a protocol such as Bluetooth. Once the strength reaches a predetermined level, which can include other characteristics such as remaining within a signal strength range, the lock electronics 40 determines that the rider has returned to his bike and automatically causes the locking ring 13 to move to an unlocked position. Such behavior can be configurable. In another embodiment, the wireless controller 30 monitors the power level from the bicycle 70 and generates an unlock message. Alternatively, the rider asserts a button on the remote wireless controller 30.

What is claimed is:

1. A bicycle locking device comprising:
    a housing configured to couple to a bicycle frame, wherein a section of the housing forms a housing arc having a gap, and wherein the gap in the housing arc is wider than a bicycle wheel width;
    a locking ring configured substantially within the housing arc, wherein the housing and the locking ring are configured to move between a first position where the locking ring substantially transects the gap and a second position where the gap is substantially open;
    an electronic actuator component configured to act on the locking ring to move the locking ring from the first position to the second position, and wherein the electronic actuator is configured to receive an indication to move the locking ring to the first position or to the second position;
    a communication electronics component coupled to the electronic actuator component, wherein the communication electronics component is configured to generate an indication to the actuator to move the locking ring into the first position or the second position, wherein the communication electronics component is configured to wirelessly receive from a second device a lock or unlock message, and wherein the communication electronics component is configured to send to the second device an alert indication; and
    a sound generation component which is activated responsive to detection of movement of the bicycle to send notification of the detected movement to the second device.

2. The device of claim 1, wherein the communication electronics component is configured to operate in a Global System for Mobile communication environment.

3. The device of claim 1, wherein the second device comprises wireless transceiver electronics configured to communicate with the communication electronics component.

4. The device of claim 1, wherein the housing is comprised of a front casting and a rear casting, wherein the front casting and the rear casting are coupled together by a securing means, and wherein the housing comprises a gasket arranged between the front casting and the rear casting for sealing the housing.

5. The device of claim 4, wherein the gasket is made of a material selected from a group consisting of paper, rubber, silicone, metal, rubber, plastic polymer or any combination thereof.

6. The device of claim 4, further comprising an accelerometer electronics component, wherein the accelerometer electronics component is configured to detect motion of the bicycle locking device when the locking ring is in the first position and wherein the accelerometer electronics component configures the sound generation component to output sound when motion is detected.

7. The device of claim 6, wherein the accelerometer electronics is adapted to learn user operational status to adjust sensitivity of the accelerometer for controlling the sound generation component to output sound based on operational status.

8. The device of claim 7, wherein the sensitivity of the accelerometer is set to be high and low to avoid false siren alarm.

9. The device of claim 1, wherein the locking ring comprises a cross-sectional shape of square or rectangle with chamfered or rounded edges.

10. The device of claim 1, further comprising a mounting mechanism for mounting the bicycle locking device on the bicycle frame.

11. The device of claim 10, wherein the mounting mechanism comprises:
   at least one locking flange arranged on the housing, the at least one locking flange comprising a plurality of mounting holes;
   at least one locking bolt; and
   at least one bolt recess arranged on the bicycle frame, wherein the at least one bolt recess is configured to receive the at least one locking bolt, passing through at least one of the plurality of mounting holes of the at least one locking flange, to mount the bicycle locking device on the bicycle frame.

12. The device of claim 1, further comprising a Global Positioning System (GPS) receiver located in the housing, the GPS receiver configured to:
   determine at least one of a location, a position and a velocity; and
   communicate with a cloud server using the communication electronics component to transmit the determined location, position and velocity.

* * * * *